United States Patent
Brother et al.

(10) Patent No.: US 6,583,199 B2
(45) Date of Patent: Jun. 24, 2003

(54) LIGHTWEIGHT COMPOSITE MATERIAL FOR PROTECTIVE PADS, CUSHIONS, SUPPORTS OR THE LIKE AND METHOD

(75) Inventors: Theodore B. Brother, Andover, MA (US); Edward J. Ellis, Lynnfield, MA (US)

(73) Assignee: I-TEK, Inc., Lawrence, MA (US)

( * ) Notice: Subject to any disclaimer, the term of this patent is extended or adjusted under 35 U.S.C. 154(b) by 0 days.

(21) Appl. No.: 09/970,138

(22) Filed: Oct. 3, 2001

(65) Prior Publication Data

US 2003/0072903 A1 Apr. 17, 2003

(51) Int. Cl.⁷ .............................. C08K 5/09; C08K 3/26
(52) U.S. Cl. ..................... 523/204; 523/222; 524/300; 524/321; 524/322; 524/425
(58) Field of Search .................... 523/204, 222; 524/300, 321, 322, 425

(56) References Cited

U.S. PATENT DOCUMENTS

| | | | |
|---|---|---|---|
| 3,529,368 A | 9/1970 | Canfield | 36/2.5 |
| 3,748,669 A | 7/1973 | Warner | 5/348 WB |
| 3,986,213 A | 10/1976 | Lynch | 3/36 |
| 4,038,762 A | 8/1977 | Swan, Jr. | 36/89 |
| 4,229,546 A | 10/1980 | Swan, Jr. | 521/55 |
| 4,252,910 A | 2/1981 | Schaefer | 521/145 |
| 4,728,551 A | 3/1988 | Jay | 428/76 |
| 4,952,439 A | 8/1990 | Hanson | 428/72 |
| 5,058,291 A | 10/1991 | Hanson | 36/117 |
| 5,093,138 A | 3/1992 | Drew et al. | 426/68 |
| 5,100,712 A | 3/1992 | Drew et al. | 428/68 |
| 5,147,685 A | 9/1992 | Hanson | 428/189 |
| 5,204,154 A | 4/1993 | Drew et al. | 428/68 |
| 5,362,543 A | 11/1994 | Nickerson | 428/76 |
| 5,421,874 A | 6/1995 | Pearce | 106/122 |
| 5,432,000 A | 7/1995 | Young, Sr. et al. | 428/372 |
| 5,501,659 A | 3/1996 | Morris et al. | 602/27 |
| 5,549,743 A | 8/1996 | Pearce | 106/122 |
| 5,596,770 A | 1/1997 | Kunesh | 2/239 |
| 5,625,896 A | 5/1997 | LaBarbera et al. | 2/22 |
| 5,626,657 A | 5/1997 | Pearce | 106/122 |
| 5,833,639 A | 11/1998 | Nunes et al. | 602/23 |
| 5,869,164 A | 2/1999 | Nickerson et al. | 428/76 |
| 6,020,055 A | 2/2000 | Pearce | 428/323 |
| 6,026,527 A | 2/2000 | Pearce | 5/654 |
| 6,455,606 B1 * | 9/2002 | Kaku et al. | 521/170 |

* cited by examiner

Primary Examiner—Kriellion A. Sanders
(74) Attorney, Agent, or Firm—Nields & Lemack

(57) ABSTRACT

An improved material for use in resilient conforming pads, cushions, impact resistance padding and the like is described. The material comprises hollow coated micro particles cohered to a mass by a combination of a carboxylic acid bonding agent and a hydrophobic fluid. The material is useful for providing low weight contour conforming resilient padding for garments, athletic equipment, prosthetic devices, surgical or vehicular cushions, positioning devices, mattresses impact protective padding and the like.

6 Claims, No Drawings

LIGHTWEIGHT COMPOSITE MATERIAL FOR PROTECTIVE PADS, CUSHIONS, SUPPORTS OR THE LIKE AND METHOD

BACKGROUND OF THE INVENTION

A wide variety of compositions have been developed for use in seats, cushions mattresses, fitted pads, athletic equipment (including impact absorbing materials), prosthetic devices and similar apparatus which are placed in contact with the human body. Such compositions provide form support, comfort and protection because they have the ability to deform in response to continuously applied pressure or the ability to absorb significant amounts of energy from rapidly applied pressure (impact). In addition, it is a desirable feature for these compositions to be lightweight. This can be achieved to some degree by employing foams or composite materials.

A review of the prior art reveals many examples of materials for use in cushioning and padding applications. These materials generally fall into one or two categories: conventional foams and viscous liquids.

Foams offer the advantages of low cost, lightweight and the ability to exhibit a wide variety of physical properties such as: flexible to rigid, instantaneous or delayed recovery and closed or open cell (breath ability). On the other hand, foams do not flow and therefore are not pressure compensating. In addition, foams do not dissipate energy in impact situations.

Viscous liquids may be either water based or oil based. Generally water based systems are produced by dissolving a water-soluble polymer to increase the viscosity to produce a thick flowable liquid or a gel. While these systems offer pressure compensation in applications such as conforming cushions, they have a specific gravity of about 1.0 versus foams which can be produced with specific gravity of 0.2 or less. Water based systems, when used in cushioning applications, must be protected against evaporation, freezing and microbial growth. Use of an oil-based system overcomes the deficiencies noted for water-based systems. Examples of oil-based materials would include silicon oils, hydrocarbon oils, mineral oil and synthetic polymers such a polyamides and polyglycols. The useful viscosity range for these oils range from about 1,000 to up to 1,000,000 centipoise, depending on the application and the other components that are utilized in the formulation.

U.S. patents to Terrence M. Drew et al. issued Mar. 3, 1992 (U.S. Pat. No. 5,093,138) and Mar. 31, 1992 (U.S. Pat. No. 5,100,712) describe a flowable, pressure compensating composition including water, a material for increasing the viscosity of water, and spherical particles dispersed throughout the volume of the water. The composition disclosed in these patents is a deformable fluid that has the disadvantages of substantial weight, memory, and being slow to flow or shear in response to a deforming pressure.

U.S. patents to Chris A. Hanson issued Oct. 22, 1991 (U.S Pat. No. 5,058,291) and Aug. 28, 1990 (U.S. Pat. No. 4,952,439) describe padding devices, which are resistant to flow in response to an instantly applied pressure. The composition of the padding material is a combination of wax and discrete particles, including microspheres. The padding disclosed in these patents has the disadvantage of being slow to flow in response to pressure, thus having a high shearing force. The materials disclosed in these patents also have memory, causing them to tend to return to their original shape after removal of a deforming pressure. Memory is described in U.S. patents to Chris A. Hanson issued Sep. 15, 1992, (U.S. Pat. No. 5,147,685), Terrence M. Drew issued Apr. 20, 1993 (U.S. Pat. No. 5,204,154), Chris A. Hanson issued Aug. 28, 1990 (U.S. Pat. No. 4,952,439), Thomas F. Canfield issued Sep. 22, 1970 (U.S. Pat. No. 3,529,368), Terrence M. Drew et al. issued Mar. 3, 1992 (U.S. Pat. No. 5,093,138), Chris A. Hanson issued Oct. 22, 1991 (U.S. Pat. No 5,058,291) and Terrence M. Drew, et al. issued Mar. 31, 1992 (U.S. Pat. No. 5,100,712)

U.S. patents to Eric C. Jay issued Mar. 1, 1988, (U.S. Pat. No. 4,728,551), Jack C. Swan, Jr. issued Jan. 6, 1981 (U.S. Pat. No. 4,229,546), Jack C. Swan, Jr. issued Jan. 6, 1981 (U.S. Pat. No. 4,038,7620), Henry Wilfred Lynch issued Oct. 19, 1976 (U.S. Pat. No. 3,986,213) and Frederick L. Warner issued Jul. 31, 1973 (U.S. Pat. No. 3,748,669), disclose pressure-compensating mixtures, which are generally characterized by having a quantity of micro beads dispersed in a flowable liquid medium. Disadvantages of such mixtures include their weight, head pressure and memory. The liquid described in those patents is formulated for certain flow characteristics and the micro beads are merely added because of their low specific gravity to reduce the total weight of the mixture. The resulting mixture is still very heavy because the light micro beads are not used to replace a substantial amount of the heavy liquid, but are instead used only to provide a slight weight reduction of the mixture compared to the use of a liquid alone.

U.S. patents to Tony M. Pearce issued Jun. 6, 1995 (U.S. Pat. No. 5,421,874), Aug. 27, 1996 (U.S. Pat. No. 5,549,743), May 6, 1997 (U.S. Pat. No. 5,626,657), Feb., 1, 2000 (U.S. Pat. No. 6,020,055), describe a composite mixture of spherical objects and lubricant useful for its cushioning properties. The composite may be composed of microspheres and any of a variety of lubricants that involves sliding and rolling contact of the spherical particles with respect to each other. This creates a situation where interactions between spherical particles are avoided. The result is the inability to transfer localized loading through out the composite material and can lead to "bottoming out" of the cushion or padding device.

U.S. patent to Lincoln P. Nickerson, issued Nov. 8, 1994 (U.S. Pat. No. 5,362,543), describes a composite composition comprising a silicone fluid with an amide thickener filled with glass or phenolic micro- spheres. Their compositions are particularly characterized by their ability to flow in response to a continuously applied pressure, yet to maintain their shape and position in the absence of applied pressure.

The use of block copolymers in padding and cushioning compositions is described in U.S. patents issued to Tony M. Pearce, issued Feb. 22, 2000 (U.S. Pat. No. 6,026,527), and to Lincoln P. Nickerson issued Feb. 9, 1999 (U.S. Pat. No. 5,869,164). These patents disclose the use of ABA type block copolymers, generally composed of one block of polystyrene and the other block of a soft rubber like elastomer. The addition of these block copolymers to oil based vehicles results in a thixotropic fluid. Microspheres are utilized to lower the density of these compositions.

U.S. patent to Philip Schaefer, issued Feb. 24, 1981 (U.S. Pat. No. 4,252,910) describes a material for use in resilient conforming pads, cushions and the like. The material comprises plastic micro- spheres cohered to a mass by what he terms a thermoplastic "bonding agent". The "bonding agent" is a polybutene polymer in the molecular weight range of 3,000 to 7,500. Given this relatively narrow molecular weight range the visco-elastic properties of the Schaefer compositions are rather limited. In fact, Schaefer states that the bonding agent is flowable plastic at about, or slightly higher than body temperature. Given these conditions and restrictions the Schaefer invention is quite limited in its scope.

SUMMARY OF THE INVENTION

The present invention is directed to improved, lightweight compositions for padding and cushioning devices. These compositions comprise three components: a hydrophobic, water insoluble liquid, typically a paraffinic-based fluid, as a vehicle; calcium carbonate coated micro-spheres, as a lightweight included phase; and a carboxylic acid containing bonding agent. Furthermore, it is an important aspect of this invention that both the fluid based vehicle, in conjunction with the carboxylic acid containing component is bonded or adhered to the calcium carbonate coated microspheres, in order to provide a means of attaining improved response and distribution of mechanical loads. In addition, improved bonding or adhesion also provides for better dispersion of the microspheres and as a result, better stability of the composition, that is, better resistance to separation of the microspheres from continuous vehicle phase.

A variety of paraffinic fluids can be used as the vehicle. The preferred fluids are saturated polyalphaolefins, mineral oils and polybutene fluids including polyisobutylene and poly-1-butene.

Microspheres serve to significantly lower the density of the composite material. The microspheres of this invention are lightweight, hollow plastic microspheres that are surface coated with calcium carbonate. The calcium carbonate coating is typically from about 1 micron to about 5 microns in thickness. The average, or preferred, thickness is about 3 microns. These microspheres offer the benefit of elasticity and can undergo instantaneous compression and recovery for impact padding uses.

The carboxylic acid containing bonding agent is a mono or di-carboxylic acid containing compound, either saturated or unsaturated, conforming to the general formulae:

$CH_3(CH_2)_n$—COOH saturated mono-acid

Where n=6 to 30

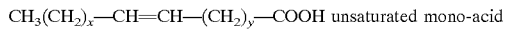

$CH_3(CH_2)_x$—CH=CH—$(CH_2)_y$—COOH unsaturated mono-acid

Where x and y are independent and x=2 to 15 and y=2 to 15
And

HOOC—$(CH_2)_n$—COOH saturated di-acid

Where n=6 to 30

HOOC—$(CH_2)_x$—CH=CH—$(CH_2)_y$—COOH unsaturated di-acid

Where x and y are independent and x=2 to 15 and y=2 to 15

The compositions of the present invention are especially useful as filling materials for deformable, pressure compensating padding devices comprising a flexible protective envelope having a cavity which contains the composition and which envelope has structure that allows the composition to deform in the cavity in response to a continuously applied load upon said envelope, but to maintain position in the absence of pressure.

In the case where the applied load is instantaneous, such as in impact, said envelope deforms minimally and the transferred energy is effectively dissipated by the contained composition. The compositions of the present invention are particularly characterized by their:

1. Ability to deform by flowing in response to a continuously applied pressure.
2. Ability to dissipate or absorb the kinetic energy that results from an impact event.
3. Tendency to maintain shape and position in the absence of an applied pressure.
4. Lack of resiliency, under loading normally associated with materials such foams or elastomers.
5. Minor changes in viscosity when subjected to changes in temperature.
6. Resistance to phase separation of the vehicle and microsphere components.
7. Chemical compatibility with vinyl, polyurethane and polyolefin films.
8. Excellent biocompatibility that is non-poisonous and low probability of contact dermatitis.
9. Low potential for microbial growth.
10. Stable over time, that is, long shelf life.

DESCRIPTION OF PREFERRED EMBODIMENTS

The composite materials of this invention are composed of at least three elements; a hydrophobic, water insoluble fluid, typically a paraffinic fluid, calcium carbonate treated microspheres and a bonding agent. Although we are not bound to a particular theory, we believe, based on scientific principles, that the bonding agent serves as a "bridge" between the microspheres and the hydrophobic, water insoluble, fluid vehicle. This "bridge" provides a means for improved dispersion of the microspheres by altering the surface characteristics of the microspheres from polar to non-polar. The non-polar hydrocarbon surface provided by the methods of this invention provides excellent compatibility with paraffinic fluids. In addition to attaining improved dispersion of the microspheres the tendency of the microspheres to separate is greatly reduced.

FIG. 1 illustrates the principle of this invention with stearic acid utilized as the bonding agent. Stearic acid is a molecule that has a $C_{18}$ hydrocarbon chain attached to a carboxylic acid. This combination of a non-polar long hydrocarbon chain attached to a very polar carboxylic acid group provides the molecular structure necessary to practice this invention. The stearic acid will attach to the polar surface of the microsphere through hydrogen bonding of the acid with the calcium carbonate surface layer on the microspheres. The $C_{18}$ hydrocarbon portion of the stearic acid is oriented in such a manner that the surface of the microsphere is now non-polar. The hydrocarbon chains on the surface of the microsphere are compatible with hydrophobic fluids. For example, the "hydrophobic bonding" created between a paraffinic fluid vehicle and the surface bound hydrocarbon chains results in better dispersion of the microspheres in the paraffinic vehicle and improved compatibility with less tendency for separation of components within the composite material. In addition, the composites of the invention can be tailored, through formulation, to provide proper response and distribution to imposed mechanical loads depending on the requirements of a particular application. Examples of such applications would include, but not be limited to, seat cushions, mattresses, impact protective gear and flotation devices.

FIGURE I

PARAFFINIC FLUID

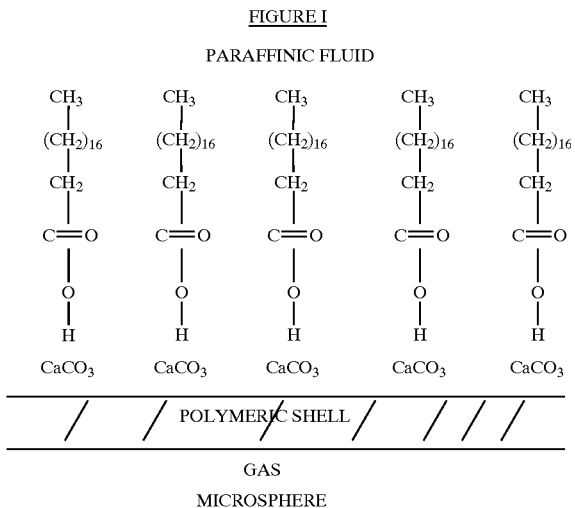

GAS MICROSPHERE

The composition of this invention comprises these components:

a) a paraffinic based fluid as a vehicle and matrix phase;

b) calcium carbonate coated microspheres as a light weight included phase; and c) a mono or di-carboxylic acid containing bonding agent.

A variety of paraffinic fluids can be utilized in the practice of this invention. The preferred fluids are saturated polyalphaolefins; mineral oils and polybutene fluids including polyisobutylene and poly-1-butene. Other oils, such as vegetable oils and dialkyl carbonate oils may also be utilized. Combinations of the above listed fluids may also be employed. The molecular weight of the paraffinic fluids is generally in the range of from about 150 to about 16,000. Preferably the molecular weight should be in the range from about 400 to about 3000.

The microspheres utilized in the practice of this invention are hollow plastic microspheres surface coated with calcium carbonate. The preferred particle size of the coated microspheres ranges from about 10 microns to about 200 microns. The more preferred particle size range is from about 20 microns to about 150 microns. The most preferred particle size is about 90 microns to about 150 microns. The larger particle size microspheres allow very low density composite materials to be formulated. These coated microspheres can be obtained from Pierce & Stevens Corp. in Buffalo, N.Y.

The carboxylic acid containing bonding agent is a mono or di-carboxylic acid containing compound, either saturated or unsaturated, conforming to the general formulae:

$CH_3(CH_2)_n$—COOH saturated mono-acid

Where n=6 to 30

$CH_3(CH_2)_x$—CH=CH—$(CH_2)_y$—COOH unsaturated mono-acid

Where x and y are independent and x=2 to 15 and y=2 to 15

And

HOOC—$(CH_2)_n$—COOH saturated di-acid

Where n=6 to 30

HOOC—$(CH_2)_x$—CH=CH—$(CH_2)_y$—COOH unsaturated di-acid

Where x and y are independent and x=2 to 15 and y=2 to 15

Examples of useful mono-acids in the practice of this invention include, but are not limited to, hexanoic acid, octanoic acid, lauric acid, and stearic acid. Examples of useful di-acids in the practice of this invention include, but are not limited to, suberic acid and dodecandioic acid. Other additives which may be incorporated into the materials of this invention include: flame retardants, biocides, preservatives, antioxidants, UV stabilizers, extenders, fillers, tackifiers and colorants.

A bladder or "envelope" is often utilized to confine the composite material of this invention. The bladder may be fabricated from any flexible film like material that is inert to the composition itself and or its individual components. Useful films include: polyurethane, polyvinyl chloride and polyolefins. Preferably, the material used to construct the bladder will be heat or radio frequency sealed able to provide a substantially impervious seal, which prevents leakage of composite material. It is also important that the bladder material be durable and retains its flexible, pliable properties over a useful temperature range for extended periods of time. A typical bladder may be constructed with flexible thermoplastic film such as PVC, Thermoplastic Polyurethane and coated polyolefin film such as Covelle® (Dow). A typical bladder can be constructed from the previously mentioned film in thickness of 3 mil to as thick as 50 mil.

Two pieces of the desired thermoplastic film are cut into a square shape approximately ¼" greater in size than the final size desired. One piece is placed on top of the other. A brass sealing die is constructed in the proper dimensions of the finished bladder. This die can have shapes of various degrees of complexity. For the sake of this illustration the basic shape is a rectangle approximately 4 inches wide and 6 inches long and contains a narrow extension of approximately 2 inches extending approximately 1 inch beyond the narrow end. This gives the die (and the resultant bladder) the approximate shape of a bottle with a 1inch neck. The two pieces of stacked film are placed on the bed of a RF sealing machine, the tool or dies is carefully placed on the stacked film, covered with an insulator and the power applied. This results in producing a two dimensional flat bladder with a 1 inch neck through witch the cushioning material of this invention can be filled.

The cushioning material is then pumped into the bladder to the desired quantity, excess air is removed by gentle squeezing action and the filled bladder is placed back on the RF Sealing machine. A straight brass blade is placed across the opening of the neck and sufficient current is applied to weld a seal at the proper place along the neck.

The result is a 4 inch by 6 inch bladder filled with a light weight compositions of this invention. This filled bladder or a number of filled bladders attached together can be employed in cushioning applications for small surfaces such as surgical pads to larger surfaces for cushioning and pressure reduction in mattress and seating applications.

The following examples will serve to illustrate the practice of this invention. It is understood these examples are set forth merely for illustrative purposes and many other compositions are within the scope of the present invention. Those skilled in the art will recognize that the compositions containing other quantities of material and different species of the required materials may be similarly prepared. The following table describes the formulations set forth in the examples.

| FORMULATION MATERIALS | |
|---|---|
| CODE | DESCRIPTION |
| PB 450 | Polybutene of molecular weight 450 |
| PB 950 | Polybutene of molecular weight 950 |
| KAYDOL | White mineral oil (WITCO) |
| OLEIC ACID | Unsaturated mono-acid |
| STEARIC ACID | Saturated di-acid |
| DODECANEDOIC ACID | Saturated di-acid |
| M S-7000 | Calcium carbonate coated microsphere, 130–150μ diameter |
| M S-7020 | Calcium carbonate coated microsphere, 20–40μ diameter |
| M 6001 AE | Calcium carbonate coated microsphere, 40–60μ diameter |
| M 6050 AE | Calcium carbonate coated microsphere, 90–110μ diameter |

EXAMPLE 1

The following example details the process for producing the composite materials of the invention. To a low shear mixer, such as a dough mixer or a ribbon blender, add the vehicle fluid either at room temperature or at a temperature up to about 100° C. Use of higher temperatures lowers the viscosity of the vehicle fluid and aids in the dissolving of the carboxylic acid containing bonding agent.

The carboxylic acid containing bonding agent is then added to the vehicle and mixing is continued until a uniform solution is achieved. At this point the calcium carbonate coated microspheres are added to the modified vehicle and mixing is continued until the microspheres are uniformly dispersed and well bonded to the vehicle phase through the carboxylic acid containing modifying agent. The resulting composite material is then stored until use.

EXAMPLE 2

This example illustrates the practice of the invention utilizing stearic acid as the bonding agent. The following formulations, in grams, were prepared by the method outlined in Example 1.

| FORMULATION | A | B | C |
|---|---|---|---|
| P0450 | 39.6 | 38.0 | 36.0 |
| STEARIC ACID | 0.4 | 2.0 | 4.0 |
| M S-7000 | 10.0 | 10.0 | 10.0 |
| DENSITY, grams/cc | 0.230 | 0.230 | 0.230 |

The resulting material was found to be stable, that is, no separation of microspheres from the vehicle over time, indicating that the microspheres are well bonded to the vehicle phase.

EXAMPLE 3

This example illustrates the practice of this invention utilizing oleic acid as the bonding agent. The following formulations, in grams, were prepared by the method outlined in Example 1.

| FORMULATION | A | B | C |
|---|---|---|---|
| PB450 | 29.0 | 28.0 | 27.0 |
| OLEIC ACID | 1.0 | 2.0 | 3.0 |
| M S-7000 | 10.0 | 10.0 | 10.0 |
| DENSITY, grams/cc | 0.198 | 0.201 | 0.194 |

The resulting material was found to be stable, that is, no separation of the microspheres from the vehicle over time indicating that the microspheres are well bonded to the vehicle phase.

EXAMPLE 4

This example illustrates the practice of this invention utilizing stearic acid as the bonding agent to produce very low density compositions. The following formulations, in grams, were prepared by the method outlined in Example 1.

| FORMULATION | A | B | C |
|---|---|---|---|
| PB450 | 29.7 | 28.5 | 27.0 |
| STEARIC ACID | 0.3 | 1.5 | 3.0 |
| M S-7000 | 10.0 | 10.0 | 10.0 |
| DENSITY, grams/cc | 0.206 | 0.215 | 0.198 |

EXAMPLE 5

This example illustrates the practice of this invention utilizing oleic acid as the bonding agent with three types of calcium carbonate coated plastic microspheres. The following formulations, in grams, were prepared by the method outlined in Example 1.

| FORMULATION | A | B | C |
|---|---|---|---|
| PB450 | 39.0 | 39.0 | 39.0 |
| OLEIC ACID | 1.0 | 1.0 | 1.0 |
| M 6050 AE | 10.0 | — | — |
| M 6001 AE | — | 10.0 | — |
| M S-7020 | — | — | 10.0 |

Formulations A, B, and C produced light weight, bonded materials.

EXAMPLE 6

This example illustrates the practice of this invention utilizing dodecanedioic acid and suberic acid, both difunctional acids, as bonding agents. The following formulations, in grams, were prepared by the method outlined in Example 1.

| FORMULATION | A | B |
|---|---|---|
| PB450 | 39.0 | 39.0 |
| SUBERIC ACID | 1 | — |
| DUDECANEDIOIC ACID | — | 1 |
| M S-7000 | 10.0 | 10.0 |
| DENSITY, grams/cc | 0.230 | 0.230 |

Formulations A and B produced light weight, bonded materials.

EXAMPLE 7

This example illustrates the practice of this invention utilizing a polybutene of molecular weight 950 as the vehicle with oleic acid as the bonding agent. The following formulations, in grams, were prepared by the method outlined in Example 1.

| FORMULATION | A | B | C | D |
|---|---|---|---|---|
| PB950 | 38.0 | 38.0 | 38.0 | 38.0 |
| OLEIC ACID | 2.0 | 2.0 | 2.0 | 2.0 |
| M S-7000 | 10.0 | — | — | — |
| M S-7020 | — | 10.0 | — | — |
| M 6050 AE | — | — | 10.0 | — |
| M 6001 AE | — | — | — | 10.0 |

Formulation A produced a very tacky, non-flowable material. Formulations B, C, and D produced tacky, non-flowable materials.

EXAMPLE 8

This example illustrates the practice of this invention utilizing a white mineral oil as the vehicle with oleic acid as the bonding agent. The following formulations, in grams, were prepared by the method outlined in Example 1.

| FORMULATION | A | B | C | D |
|---|---|---|---|---|
| KAYDOL | 28.0 | 28.0 | 28.0 | 28.0 |
| OLEIC ACID | 2.0 | 2.0 | 2.0 | 2.0 |
| M S-7000 | 10.0 | — | — | — |
| M S-7020 | — | 10.0 | — | — |
| M 6050 AE | — | — | 10.0 | — |
| M 6001 AE | — | — | — | 10.0 |
| DENSITY, grams/cc | 0.374 | 0.321 | 0.296 | 0.327 |

What is claimed is:

1. A composite material suitable for use in cushioning and padding applications comprising:
  a. a hydrophobic, non water soluble, fluid as the vehicle;
  b. a calcium carbonate coated, hollow, plastic microsphere;
  c. a mono- or di-carboxylic acid, either saturated or unsaturated, bonding agent conforming to the formulae selected from the group consisting of:

$$CH_3(CH_2)_n\text{—COOH saturated mono-acid}$$

where n=6 to 30;

$$CH_3(CH_2)_x\text{—CH=CH—}(CH_2)_y\text{—COOH unsaturated mono-acid}$$

where x and y are independent and x=2 to 15 and y=2 to 15;

$$HOOC\text{—}(CH_2)_n\text{—COOH saturated di-acid}$$

where n=6 to 30; and $$HOOC\text{—}(CH_2)_x\text{—CH=CH—}(CH_2)_y\text{—COOH unsaturated di-acid}$$

where x and y are independent and x=2 to 15 and y=2 to 15.

2. The composite material of claim 1, wherein said vehicle is selected from the group consisting of saturated polyalphaolefins, mineral oils, polyisobutylene, poly-1-butene and combinations thereof.

3. The composite material of claim 1, wherein said bonding agent is selected from the group consisting of hexanoic acid, octanoic acid, lauric acid, stearic acid, suberic acid and dodecandioic acid.

4. The composite material of claim 1, wherein said bonding agent is stearic acid.

5. A method of forming a composite material, comprising:
  mixing a vehicle comprising a hydrophobic, non-water soluble fluid, with a carboxylic acid-containing bonding agent until a uniform solution is obtained;
  introducing calcium carbonate coated microspheres to said solution and mixing until said microspheres are uniformly dispersed.

6. The method of claim 5, wherein said vehicle and bonding agent are mixed at a temperature of from about 25° C. to about 100° C.

* * * * *